F. TAGG.
NUT LOCK.
APPLICATION FILED APR. 29, 1919.
1,325,340.
Patented Dec. 16, 1919.
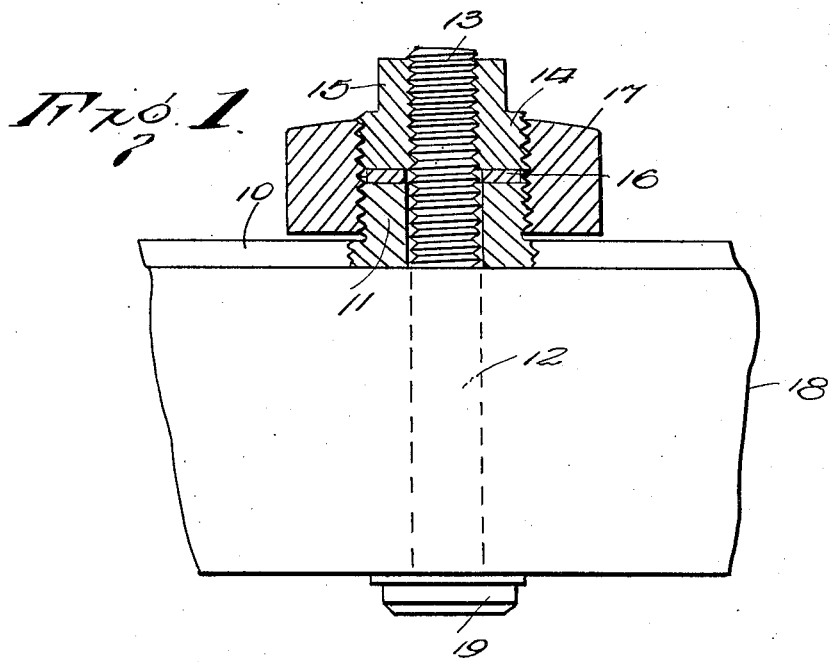
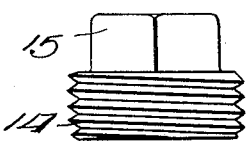
F. Tagg
Inventor
By Geo. P. Kimmel
Attorney

UNITED STATES PATENT OFFICE.

FREDERIC TAGG, OF ENDIANG, ALBERTA, CANADA.

NUT-LOCK.

1,325,340.      Specification of Letters Patent.      Patented Dec. 16, 1919.

Application filed April 29, 1919. Serial No. 293,417.

*To all whom it may concern:*

Be it known that I, FREDERIC TAGG, a subject of the King of England, residing at Endiang, in the Province of Alberta and Dominion of Canada, have invented certain new and useful Improvements in Nut-Locks, of which the following is a specification.

This invention relates to improvements in nut locks, and has for one of its objects to simplify and improve the construction and increase the efficiency and utility of devices of this character.

Another object of the invention is to provide a device of this character which may be readily adapted to various forms of structure and to bolts of various sizes and to bolts employed for connecting various bodies.

With these and other objects in view the invention consists of certain novel features of construction as hereafter shown and described and then specifically pointed out in the claim, and in the drawings illustrative of the preferred embodiment of the invention, Figure 1 is a sectional elevation of the improved device, Fig. 2 is a side elevation of the nut portion of the improved device, and, Fig. 3 is a side elevation of the base portion of the improved device.

The improved device comprises a base member 10 having a stud 11 extending from one side, the stud being apertured to receive the bolt represented as a whole at 12.

The stud 11 is externally threaded as indicated, the threads being preferably left-handed as shown in Fig. 3.

The bolt 12 is provided with usual threads indicated at 13, the threads being right-handed as shown, or reversely to the threads of the stud. Clamping nut is represented as a whole at 14 and is provided with a wrench receiving projection or head 15. The threads of the nut 14 are left-handed and correspond to the threads of the stud as indicated more particularly in Fig. 2.

A spacing washer 16 may be employed between the nut 14 and the stud 11 as shown in Fig. 1 if preferred.

A clamping nut 17 is employed with the threads of the latter left-handed the same as the threads of the stud 11 and the nut 14, the threads of the stud and the nut corresponding so that the clamping nut 17 may be engaged with the threads of both the stud and the nut as shown in Fig. 1.

When the improved device is to be employed the main nut 14 is disposed upon the bolt and turned home by a wrench applied to the head member 15. After the nut has been set in position the locking nut 17 is applied and rotated to cause its teeth or threads to engage the threads of the nut and the stud. By this means an effectual lock is provided to prevent retrograde movement of the nut 14 which can be removed only by first removing the locking member 17. The improved device is simple in construction, can be readily applied to nuts of various sizes and to nuts employed for various purposes. For the purpose of illustration the bolt 12 is shown extending through the body 18 with a head 19 at the end opposite to the threads 13.

Claim:

A nut lock comprising a base member having a bolt receiving aperture and a threaded stud surrounding the aperture, a bolt extending through the base member and threaded reversely to the threads of the stud, a cylindrical nut internally threaded to engage the bolt and externally threaded to correspond to and coact with the threads of the stud, a locking member threaded to correspond to and engage the threads of the nut and the stud.

In testimony whereof I affix my signature hereto.

FREDERIC TAGG.